United States Patent
Xu et al.

(10) Patent No.: US 8,315,057 B2
(45) Date of Patent: Nov. 20, 2012

(54) EMBEDDED COMMUNICATION ENCLOSURE

(75) Inventors: Zhiyong Xu, Shanghai (CN); Bin Yu, Shanghai (CN); Min Lin, Shanghai (CN); Pierre Bonvallat, Cluses (FR); Ahmed M. Ghazy, Dubai (AE)

(73) Assignee: 3M Innovative Properties Company, St. Paul, MN (US)

( * ) Notice: Subject to any disclaimer, the term of this patent is extended or adjusted under 35 U.S.C. 154(b) by 234 days.

(21) Appl. No.: 12/934,414

(22) PCT Filed: Mar. 25, 2009

(86) PCT No.: PCT/US2009/038202
§ 371 (c)(1),
(2), (4) Date: Sep. 24, 2010

(87) PCT Pub. No.: WO2009/123895
PCT Pub. Date: Oct. 8, 2009

(65) Prior Publication Data
US 2011/0019366 A1    Jan. 27, 2011

(30) Foreign Application Priority Data
Apr. 3, 2008  (CN) .......................... 2008 1 0091819

(51) Int. Cl.
*H05K 7/20* (2006.01)
(52) U.S. Cl. ........ 361/724; 361/601; 361/826; 174/480; 174/481; 174/502
(58) Field of Classification Search .................. 361/610, 361/724; 174/502
See application file for complete search history.

(56) References Cited

U.S. PATENT DOCUMENTS

| | | | | |
|---|---|---|---|---|
| 5,001,602 A * | 3/1991 | Suffi et al. | ...................... | 361/724 |
| 5,721,394 A | 2/1998 | Mulks | | |
| 6,445,585 B1 * | 9/2002 | Walker | .......................... | 361/724 |
| 2004/0050570 A1 * | 3/2004 | Dinh et al. | ....................... | 174/50 |
| 2005/0002633 A1 | 1/2005 | Solheid et al. | | |
| 2006/0254795 A1 | 11/2006 | Thrift et al. | | |
| 2009/0097194 A1 * | 4/2009 | Takeda | ..................... | 361/679.01 |

FOREIGN PATENT DOCUMENTS
EP            1 914 578 A2    4/2008
* cited by examiner

*Primary Examiner* — Anthony Q Edwards
(74) *Attorney, Agent, or Firm* — Janet A. Kling (57) ABSTRACT

Disclosed is an embedded communication enclosure for housing and supporting communication devices and communication cables, comprising: an enclosure body; a cable connecting member, provided within said enclosure body to connect communication cables, where an input cable from the exterior of the enclosure body is connected to a plurality of distribution cables to be brought out of the enclosure body; and a first door connected with the enclosure body, for opening and closing the front of the enclosure body, said first door comprising a second door embedded therein to provide access to the cable connecting member; wherein said cable connecting member is arranged to correspond to said second door in such a manner that said cable connecting member is exposed to outside when said second door is opened. With the embedded communication enclosure, a two-stage stage operating interface is achieved, so that communication devices and cables housed in the embedded communication enclosure will not be undesirably influenced or accessed during frequently changing and maintaining terminal jumpers.

12 Claims, 5 Drawing Sheets

EMBEDDED COMMUNICATION ENCLOSURE

CROSS REFERENCE TO RELATED APPLICATIONS

This application is a national stage filing under 35 U.S.C. 371 of PCT/US2009/038202, filed Mar. 25, 2009, which claims priority to Chinese Patent Application No. 200810091819.8, filed Apr. 3, 2008, the disclosure of which is incorporated by reference in its/their entirety herein.

BACKGROUND

1. Field of the Invention

The present invention generally relates to communication interconnection and cross connection equipment and, more particularly, relates to an embedded communication enclosure for housing and supporting communication devices that provide communication connection with an input cable.

2. Description of the Related Art

In the current field of communication access, fiber to the X (FTTX) technique, as a solution of broadband application, is increasingly employed, in which fiber to the home (FTTH), fiber to the building (FTTB), and fiber to the curb (FTTC) become main choices of communication operators. In the FTTX link, an arrangement position of an optical network unit as a key device is very important. In the FTTX link, an external wall mount box or enclosure or embedded wall mount communication enclosure is usually employed in a home, building or premise to receive communication devices, for example, including the optical network unit, that provide communication connection with an input optical fiber. Frequently, these types of enclosures are located in basements, closets, or communication cupboards which may have limited available space. The external wall mount enclosure can be easily mounted, but occupies a larger outer space within the basements, closets, or communication cupboards. Compared with the external wall mounted communication enclosure, the embedded communication enclosure is substantially flush with wall in which it is mounted providing an aesthetic appearance and a significant saving of space in the installation location. These advantages make an embedded communication enclosure a popular choice for premise installations.

In many premises such as multi-family dwelling units (e.g. apartment buildings) and office buildings, customers frequently move or are relocated or the level of service required by a given customer may change. These changes in location or service level frequently require that jumpers be changed in the premise's communication enclosure to efficiently allocate resources within the premise. However, the communication devices housed in the communication enclosure do not need to be accessed as frequently. Accordingly, it is desirable to separately manage the communication devices and the jumpers, so that the jumpers can be maintained and changed without influencing the communication devices housed in the communication enclosure.

Accordingly, many attempts have been made for solving this problem. U.S. Pat. No. 7,276,659, for example, discloses an enclosure having a closure member, comprising a front door, a middle section and a back body section. The back body section is provided on the top side and/or bottom side thereof with cut-outs. One or more closure members are detachably mounted to the back body section to at least partially cover a lay-in cable entry sections defined by the cut-outs. In this way, in use, cables can be mounted into the enclosure through the cut-outs, and then the closure members are mounted to the cut-outs to close the enclosure. Thus, with the arrangement, even if the front door and the middle section of the enclosure are closed, the cables can be mounted into the enclosure, so that access to the communication devices housed in the enclosure and management of the cables can be separately implemented.

However, there still exist some problems in such an enclosure. Since the enclosure opens on the top or bottom thereof, a user has to insert the cables from the top or bottom of the enclosure, and thus operation of the enclosure is inconvenient. Moreover, due to restrictions of the enclosure's design, the cut-outs on the back body section of the enclosure are very narrow, and thus it is difficult to insert/pull the cable into/from the enclosure.

Therefore, a demand exists for an improved communication enclosure that can efficiently and reliably manage and maintain the communication devices and the cables.

SUMMARY

Accordingly, for solving the above-mentioned problem existing in the prior art, there is provided an embedded communication enclosure for housing and supporting communication devices that provide communication connection with an input cable, the embedded communication enclosure being capable of providing a two-stage operating interface, so that communication devices housed in the embedded communication enclosure will not be undesirably influenced or accessed while frequently changing and maintaining terminal jumpers.

According to an aspect of the present invention, there is provided an embedded communication enclosure for housing and supporting communication devices and communication cables, comprising: an enclosure body; a cable connecting member, provided within said enclosure body to connect communication cables, through which an input cable from the exterior of the enclosure body is connected to a plurality of distribution cables to be brought out of the enclosure body; and a first door connected with the enclosure body, for opening and closing the front of the enclosure body, said first door comprising a second door embedded therein to provide access to the cable connecting member. Said cable connecting member is arranged to correspond to said second door in such a manner that said cable connecting member is exposed to outside when said second door is opened.

The door-in-a-door approach with the cable connecting member accessible through the second door approach would also be applicable to a standard wall mount box as well as a flush mount (embedded) enclosure.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIG. 1 depicts an embedded communication enclosure according to an exemplary embodiment of the invention, in which

Further disclosure, objects, advantages and aspects of the present invention may be better understood by those skilled in the relevant art by reference to the following description of embodiments taken in conjunction with the accompanying drawings, which are given by way of illustration only, and thus are not limitative of the present invention.

DETAILED DESCRIPTION

Figure 1A:
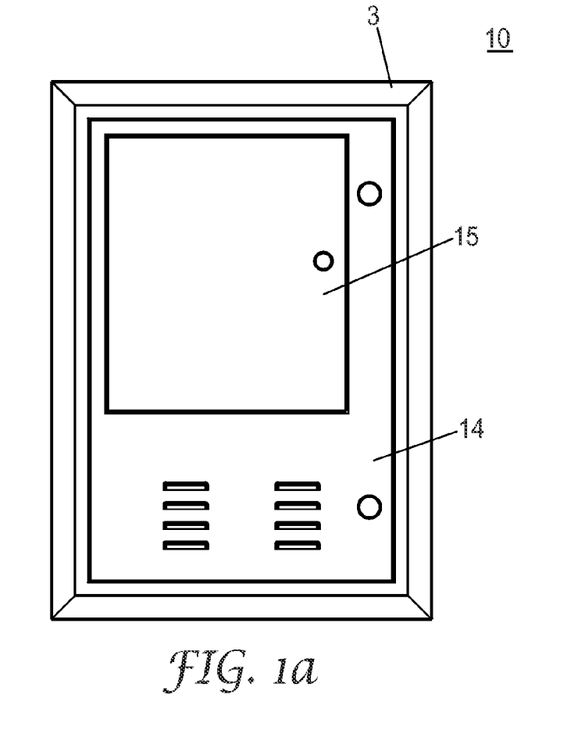
FIG. 1(a) is a front view.
Figure 1B:
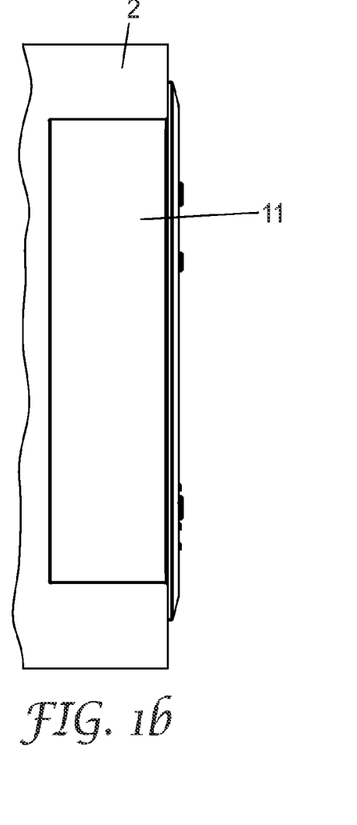
FIG. 1(b) is a side view with the embedded communication enclosure being embedded into a wall.
Figure 2:
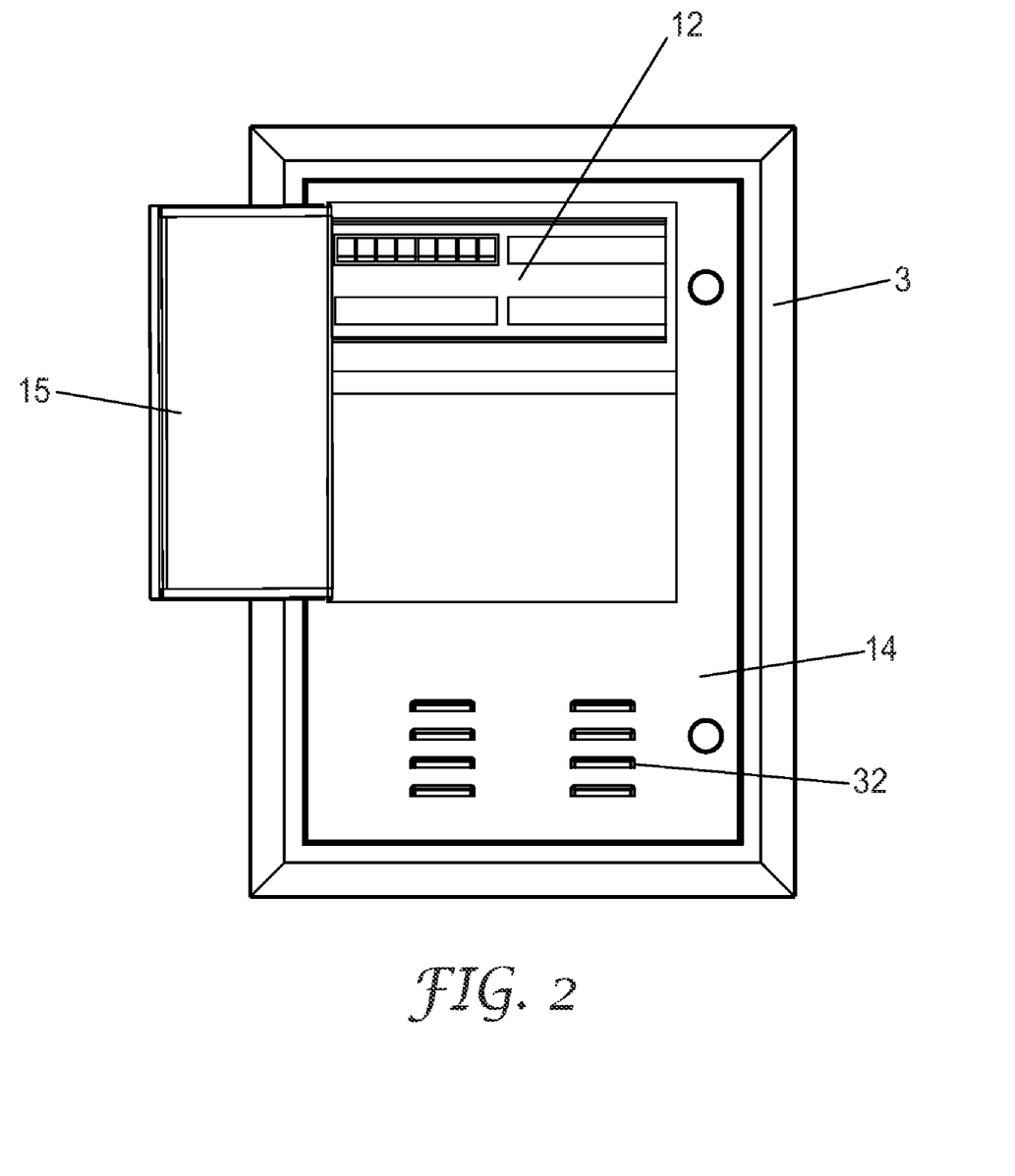
FIG. 2 depicts a perspective view of the embedded communication enclosure according to an exemplary embodiment of the invention, in which a second door is opened and a front surface of a patch panel of a cable connecting member is completely exposed out.
Figure 3:
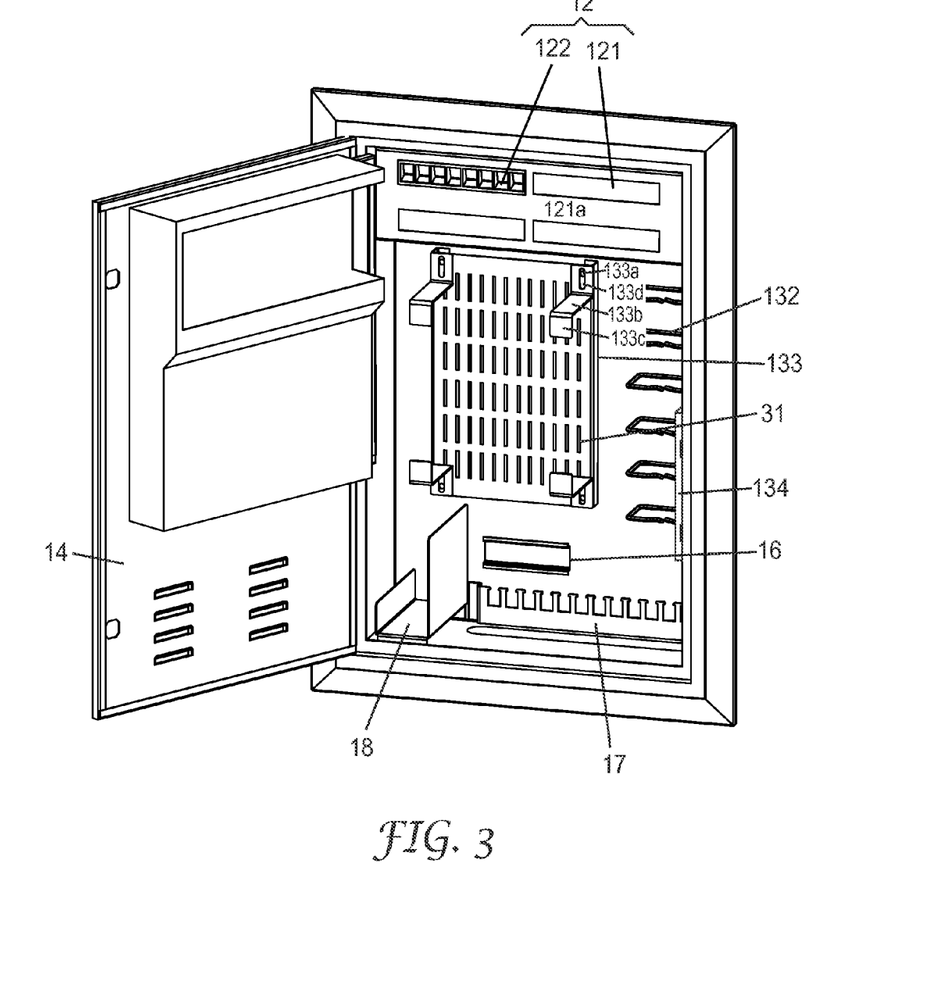
FIG. 3 depicts a perspective view of the embedded communication enclosure according to an exemplary embodiment of the invention, in which the first door and the second door of the embedded communication enclosure are opened.

An exemplary embodiment of the embedded communication enclosure according to this invention is explained by referring to FIGS. 1-3. It should be noted that this exemplary embodiment of the embedded communication enclosure is applied to optical-electronic conversion application in which signals are input through optical fibers and are output through wires, for example, copper cables. However, it is appreciated for one skilled in the art that this invention also can be applied to any suitable application, such as optical-optical conversion application in which signals are input and output through optical fibers, and electronic-electronic application in which signals are input and output through wires, for example, copper cables, and so on.

In FIGS. 1-3, the embedded communication enclosure 10 according to the exemplary embodiment of the invention, for housing and supporting communication devices and communication cables, is shown. The embedded communication enclosure 10 is mounted within an opening in a wall 2 of the premise location where it is installed. In an exemplary embodiment, an external edge frame 3 of the embedded communication enclosure 10 may be detached from the embedded communication enclosure 10 prior to mounting the embedded communication enclosure 10 into an opening in the wall 2. After the embedded communication enclosure 10 has been installed, the external edge frame 3 may be reattached to the enclosure 10.

FIGS. 1a and 1b show an exemplary embodiment of an embedded communication enclosure 10. The embedded communication enclosure has an enclosure body 11 having a substantially rectangular or square shape, and a first door 14 pivotally connected to the enclosure body 11 by a first hinge (not shown). The first door 14 can be opened to provide access to the interior of the enclosure body 11 to allow the maintenance and installation of communication devices and communication cables contained within the embedded communication enclosure 10. Alternatively, the first door 14 may be attached to the enclosure body 11 by mechanical fasteners or screws. In this alternative embodiment, the first door 14 may be removed from the enclosure body during the initial installation of the communication devices and communication cables and be secured back in place after this installation is complete.

The first door 14 of the embedded communication enclosure 10 includes a smaller second door 15 disposed therein. The second door 15 may be pivotally mounted to the first door 14 by a second hinge (not shown). The second door 15 may be opened while the first door 14 is closed to provide access to a portion of the enclosure body 11 such as to provide access to a cable connecting member which will be described in more detail below while limiting access to the remainder of the enclosure body 11.

The embedded communication enclosure 10 according to the exemplary embodiment further comprises a cable connecting member 12 (FIG. 2) disposed in the enclosure body 11 to connect the communication cables. An input cable (not shown) from the exterior of the enclosure body 11 is connected to a plurality of distribution cables (not shown) to be brought out of the enclosure body through the cable connecting member 12.

The cable connecting member 12 may comprise a patch panel 121 and a plurality of jumper plug receptacles 122 accommodated within the patch panel 121. Examples of exemplary jumper plug receptacles 122 include RJ45 style jacks such as RJ45 Cat. 5e K5E jacks available from 3M Company, St. Paul, Minn., USA, coaxial cable plug jacks, optical fiber connector couplings such as SC, LC, ST, and FC coupling formats and optical fiber sockets such as 3M™ Volition™ VF-45™ sockets or an 3M™ FA Connector socket 8710 available from 3M Company, St. Paul, Minn., USA. In an exemplary embodiment of the embedded communication enclosure 10, the patch panel 121 can accommodate 32 jumper plug receptacles 122. Alternatively, the patch panel 121 may hold any number of jumper plug receptacles 122 as required by the needs of the premise in which the embedded communication enclosure 10 is installed.

In an exemplary embodiment of the present invention, the cable connecting member 12 is arranged to correspond to the second door 15 in such a manner that the front face 121a of the patch panel 121 of the cable connecting member 12 is completely accessible when the second door 15 is opened, so that the jumper plug receptacles 122 accommodated within the patch panel 121 can be accessed.

In the exemplary embodiment shown in FIGS. 1-5, the second door 15 is provided on the upper part of the first door 14, corresponding to the position of the cable connecting member 12. However, it should be noted that the position of the second door 15 and the cable connecting member 12 are not limit thereto. The second door 15 and the cable connecting member 12 can be arranged at any suitable position in the first door 14 and the enclosure body 11, respectively, as long as the positions of the second door 15 and the cable connecting member 12 correspond to each other, such that the front face 121a of the patch panel 121 of the cable connecting member 12 is accessible when the second door 15 is opened, so that the jumper plug receptacles 122 can be accessed.

With this arrangement, a two-stage operating interface is provided for the embedded communication enclosure 10. In other words, only the second door 15 needs to be opened when jumpers are connected to the jumper plug receptacles 122 accommodated within the patch panel 121 or are changed. The first door 14 can be kept closed so as to protect the communication devices and communication cables housed in the enclosure body 11. As such, the communication devices and cables housed in the enclosure body 11 will not be undesirably accessed or influenced during jumper installation and/or maintenance. Only if the communication devices and the communication cables housed in the enclosure body 11 are required to be maintained, the first door 14 is opened. Because the second door 15 is located on the first door 14 on the front face of the embedded communication enclosure 10, the technician can easily access the patch panel 121, so that the jumpering operation can be easily implemented.

The embedded communication enclosure 10 also comprises system components disposed therein, for example, for fixing, supporting, and connecting the communication devices and the communication cables. It can be understood that the communication cables such as traditional copper cables, fiber optic cables or coax cables may be composed of data lines and signal lines.

Among the system components which disposed in the embedded communication enclosure 10 may include: a mounting rack 133 for mounting the communication devices; a plurality of retention rings 132 for arrangement and management of cables, the plurality of retention rings 132 being provided within the enclosure body 11 in such a manner that are aligned with each along the height direction of the enclosure body 11 and separated from each other, the communication cables housed in the enclosure body 11 being received in the retention rings 132 to arrange and manage the communication cables; a fixing rack 16 for fixing a power supply protection device (not shown); a cable fixing device 17 for fixing the communication cables; and protection devices, cable spools, etc. In a case where the embedded communication enclosure 10 of this invention is used in an application of optical fiber inputting, the system components may comprise optical fiber splice trays (not shown), and an optical fiber connecting cell box or fiber optic splicing module 134, etc.

Among the communication devices that can be housed in the embedded communication enclosure 10 may be active devices or passive devices. Active devices may include an optical network unit (ONU), a power supply, a power converter, amplifiers, a multiport switch, a router, a media converter, lasers, or any suitable combination thereof. Passive telecommunication devices may include an optical splitter module having 1×N fiber optic splitters, 2×N fiber optic splitters or the like, coarse wavelength division multiplexing (CWDM) components, wavelength division multiplexing (WDM) components, fanout assembly, a fiber connector parking lot, multiplexers, triplexers, duplexers, or any suitable combination thereof.

If active devices are disposed in the embedded communication enclosure 10, it will also be necessary to provide supplemental power accessories such as a connection to the premise's power system, a rectifier and/or a back-up battery.

Whenever active devices are placed in an exemplary embedded communication enclosure 10, it may be desirable to include a back-up power supply such as a backup battery, so that the telecommunication network can still function in case of loss of power in the premise power supply. In this case, the system components of the embedded communication enclosure 10 may further comprise a battery case 18 provided within the enclosure body 11. The battery case 18 is used to separately store a backup battery 181, so that the backup battery is efficiently separated from other devices within the embedded communication enclosure.

Figure 4:
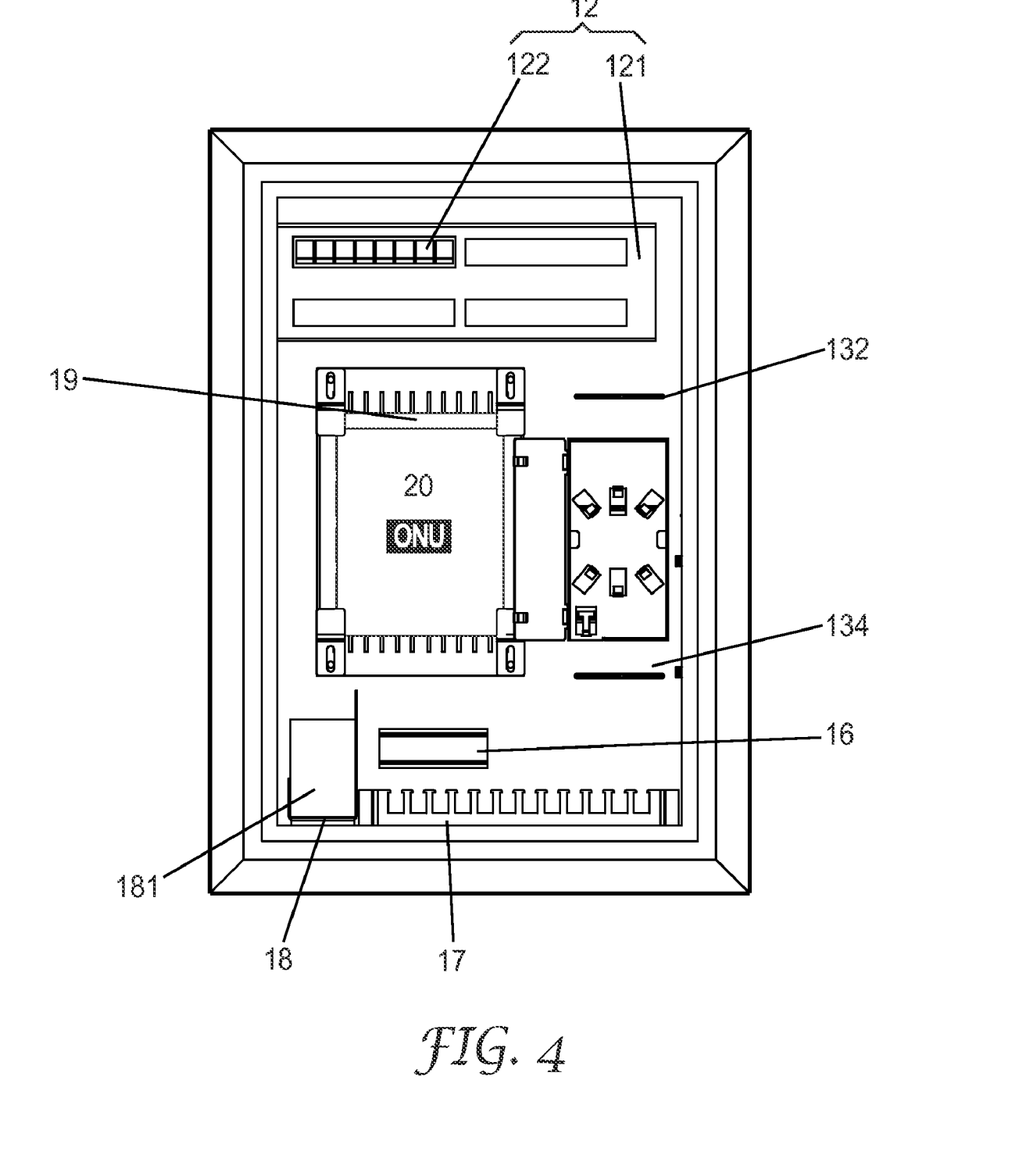
FIG. 4 depicts a front view of the embedded communication enclosure according to an exemplary embodiment of the invention, in which an optical fiber connecting cell box for connecting and supporting an input optical fiber is hanged on retention rings, an optical network unit and a rectifier are exemplarily mounted on a mounting rack, and the first door and the second door are omitted.
Figure 5:
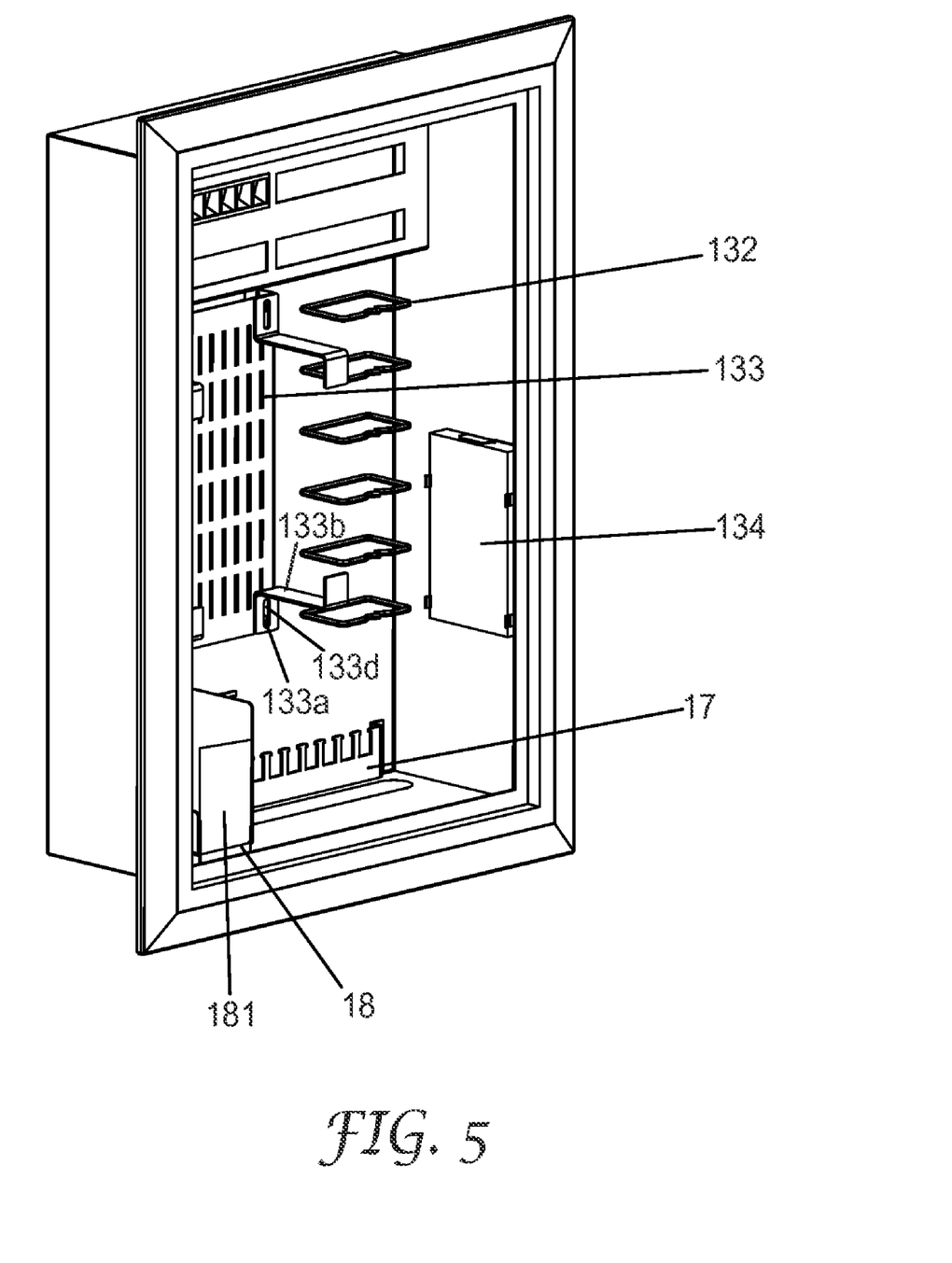
FIG. 5 depicts a perspective view of the embedded communication enclosure according to an exemplary embodiment of the invention, in which the first door and the second door are omitted.

FIGS. 4-5 show an exemplary embedded communication enclosure 10 which is used in an application of optical fiber inputting, in which components similar to those shown in FIGS. 1-3 are indicated by the same reference numbers.

In the exemplary embodiment shown in FIGS. 4-5, an input optical fiber (not shown) from the exterior of the enclosure body 11 enters into the interior of the enclosure body 11 and is connected to the optical fiber connecting cell box 134. The optical fiber connecting cell box 134 is hung within the enclosure body 11 by means of any suitable ways, such as elastic claws or positioning brackets. In an embodiment, the optical fiber connecting cell box 134 may include 3M™ No Polish Connectors (NPC, available from 3M Company) specially used for on-site terminal connection of the optical fiber. Alternatively, the optical fiber connecting cell box 134 comprises a heat shrinkage tube, a pigtail, and an optical fiber adaptor and is used for connecting the input optical fiber by a fusion splice as well-known in the art and supporting the input optical fiber.

An active device, such as an optical networking unit 20 (ONU), may be disposed in the embedded communication enclosure 10, and the optical fiber output (not shown) from the optical fiber connecting cell box 134 is connected to the ONU 20. The ONU is used for hybrid telecommunication networks and serves as an interface between a fiber optic portion of the communication network and the metallic conductor (such as copper cables or coax cables) portion of the network to convert the optical signal to an electrical signal and visa versa. Alternatively, the communication device may be an optical splitter module or CWDM module in optical-optical conversion applications.

When an active device is disposed in this exemplary embedded communication enclosure 10, a back-up battery 181 and a rectifier 19, as supplemental power accessories, are provided. The backup battery 181 is connected to the rectifier 19 for converting a direct current voltage from the backup battery into an alternating current voltage useable by the active telecommunication devices in the embedded communication enclosure 10.

The rectifier 19 for the back-up battery 181 and the ONU 20 are mounted on the mounting rack 133 such as is shown schematically shown in FIG. 4. Of course, it can be understood that any suitable active communication device and the rectifier 19 can be mounted on the mounting rack 133.

The communication devices and the rectifier 19 may be mounted on the mounting rack 133 by any suitable attachment method or device known in the art. In an exemplary embodiment, for example, as shown in FIGS. 3 and 5, the communication devices (for example, the optical network unit) and the rectifier 19 are mounted on the mounting rack 13 with screws 133a and supporting members 133b having slots 133d. The slots 133d are engaged with the screws 133a, respectively, so as to movably upwardly or downwardly mount the supporting member 133b. When a suitable position is selected according to the sizes of the communication device and the rectifier 19, the screws 133a are fastened, so that the supporting members 133b are fixed. After the communication device and the rectifier 19 are disposed on the supporting members 133b, the communication device and the rectifier 19 are secured in place by engaging bolts (not shown) with threaded holes 133c on the supporting members 133b, so that the communication device and the rectifier 19 are fixed. Other suitable ways known in the art, such as providing elastic claws on the mounting rack to press the communication device and the rectifier, can be used.

In this exemplary embodiment, the communication device is positioned with the rectifier 19 used for the backup battery 181. However, it can be understood that the rectifier can be superposed on the communication device. With such positioning, it is not necessary to provide an additional mounting device for the rectifier, such that space within the enclosure body is saved, and installation and maintain of other devices and cables in the enclosure body are facilitated.

In the exemplary embodiment shown in FIGS. 4 and 5, the communication cables, such as optical cables, copper cables, and coaxial cables, are received in the retention rings 132 to arrange and manage the cables. In an exemplary embodiment, each of the plurality of retention rings 132 has a rectangular shape and is rigidly fixed in the enclosure body 11. However, it can be understood that any suitable form, such as making the retention ring with flexible material to form any suitable shape, can be used for the retention rings, as long as the optical fiber connecting cell box 134 can be hinged on at least one of the plurality of retention rings 132 when the optical fiber connecting cell box 134 is operated for connecting the input optical fiber, as shown in FIG. 4. In this way, during connecting the optical fiber, no additional fixing device is needed for fixing the optical fiber connecting cell box, neither does a user need to manually hold the optical fiber connecting cell box. What is needed to do only is to hang the optical fiber connecting cell box 134 on the retention rings 132, so that the connecting operation is simplified. Furthermore, after connecting the optical fiber, the optical fiber connecting cell box 134 can be mounted at an internal side of the enclosure 11 through an elastic claw and an assistant positioning bracket (not shown), instead of still being hanged inside of the enclosure body, so as to avoid negatively influencing arrangement and management of other communication devices and cables, as shown FIG. 4, so that the internal space of the enclosure body 11 can be effectively used.

In an embodiment, the mounting rack 133 is provided with a plurality of elongated slots 31 for dissipating heat from various communication devices mounted on the mounting rack 133. Optionally, a window shutter 32 for facilitating circulation of air can be provided on the first door 14.

From the above description of the exemplary embodiment of the invention, it can be understood that an improved embedded communication enclosure is provided. Since the embedded communication enclosure is provided with a second door corresponding to the cable connecting member in position, a two-stage operating interface can be achieved, i.e., one operating interface is for maintaining and changing the jumpers, and the other operating interface is for mounting and connecting communication devices and cables, so that communication devices and communication cables housed in the embedded communication enclosure will not be exposed out during frequently changing and maintaining terminal jumpers, and the communication devices and communication cables will not be undesirably influenced or accessed.

Further, since the rectifier for the backup battery and the communication device may be connected with each other in the embedded communication enclosure, no additional mounting device is needed for the rectifier, so that mounting space is saved.

Further, in an application of optical-optical conversion or an application of optical-electrical conversion, the optical fiber connecting cell box is used in the embedded communication enclosure, and connecting operation of the optical fiber is simplified. In addition, since the retention rings are so configured that the optical fiber connecting cell box can be hung on the retention rings, during connecting the optical fiber, no additional fixing device is needed for fixing the optical fiber connecting cell box, neither does a user need to manually hold the optical fiber connecting cell box.

The descriptions above are intended to be illustrative, not limiting. One skilled in the art might modify a standard wall mount box or other premise enclosure with the features described above. Additional modifications may be made to the invention and be apparent to one skilled in the art without departing from the scope of the claims set out below.

COMPONENT LIST

2 Wall
10 Embedded Communication Enclosure
11 Enclosure Body
12 Cable Connecting Member
121 Patch Panel
121a Front Face
122 Jumper Plug Receptacles
132 Retention ring
133 Mounting Rack
133a Screw
133b Supporting Piece
133c Threaded Hole
133d Slot
134 Optical fiber Connecting Cell Box
14 First Door
15 Second Door
16 Power Supply Fixing Rack
17 Cable Fixing Device
18 Battery Case
181 Backup Battery
19 Rectifier
20 Communication Device
31 Elongated Slots
32 Window Shutter

What is claimed is:

1. An embedded communication enclosure for housing and supporting communication devices and communication cables, comprising:
    an enclosure body;
    a cable connecting member, provided within said enclosure body to connect communication cables, where an input cable from the exterior of the enclosure body is connected to a plurality of distribution cables to be brought out of the enclosure body; and
    a first door connected with the enclosure body, for opening and closing the front of the enclosure body, said first door comprising a second door embedded therein to provide access to the cable connecting member;
    wherein said cable connecting member is arranged to correspond to said second door in such a manner that said cable connecting member is exposed to outside when said second door is opened.

2. The embedded communication enclosure according to claim 1, wherein said cable connecting member comprises a patch panel and a plurality of jumper plug receptacles accommodated within said patch panel.

3. The embedded communication enclosure according to claim 1, further comprising a mounting rack for mounting the communication devices.

4. The embedded communication enclosure according to claim 3, wherein the communication devices are active devices.

5. The embedded communication enclosure according to claim 3, wherein the communication devices are passive devices.

6. The embedded communication enclosure according to claim 4, wherein the active devices comprise an optical network unit (ONU), a power supply, a power converter, amplifiers, a multiport switch, a router, a media converter, lasers, or any suitable combination thereof.

7. The embedded communication enclosure according to claim 4, further comprising a battery case provided within the enclosure body to separately store a backup battery.

8. The embedded communication enclosure according to claim 7, further comprising a rectifier for the backup battery wherein the rectifier and the communication devices are connected with each other to be mounted on said mounting rack together.

9. The embedded communication enclosure according to claim 5, wherein the passive devices comprise an optical splitter module having 1×N fiber optic splitters or 2×N fiber optic splitters, coarse wavelength division multiplexing components, wavelength division multiplexing components, a fanout assembly, a fiber connector parking lot, multiplexers, triplexers, duplexers, or any suitable combination thereof.

10. The embedded communication enclosure according to claim 1, further comprising a plurality of retention rings for arrangement and management of communication cables, said plurality of retention rings being provided within said enclosure body in such a manner that are aligned with each other along the height direction of the enclosure body and separated from each other.

11. The embedded communication enclosure according to claim 1, further comprising a fixing rack therein for fixing a power supply protection device.

12. The embedded communication enclosure according to claim 1, further comprising an optical fiber connecting cell box hung within said enclosure body, for connecting and supporting the input cable.

* * * * *